United States Patent [19]

Lerich

[11] 4,073,212
[45] Feb. 14, 1978

[54] ANCHOR BOLT WITH VISUAL ENGAGEMENT INDICATOR

[75] Inventor: Lester Lerich, Broomfield, Colo.

[73] Assignee: Wej-it Corporation, Broomfield, Colo.

[21] Appl. No.: 732,897

[22] Filed: Oct. 15, 1976

[51] Int. Cl.² ............................................. F16B 13/04
[52] U.S. Cl. .................................... 85/79; 116/114 R
[58] Field of Search ................... 85/79, 84, 82, 83, 72, 85/26, 31, 62, 61; 151/31; 116/114 R

[56] References Cited

U.S. PATENT DOCUMENTS

| 475,746 | 5/1892 | Assorati | 85/79 |
| 2,409,180 | 10/1946 | Annett et al. | 85/79 X |
| 2,896,494 | 7/1959 | Lerick | 85/79 |
| 3,172,329 | 3/1965 | Setzler | 85/79 |
| 3,333,499 | 8/1967 | Rudd | 85/26 X |
| 3,427,919 | 2/1969 | Lerich | 85/79 X |
| 3,602,186 | 8/1971 | Popenoe | 85/62 |

FOREIGN PATENT DOCUMENTS

| 956,348 | 8/1949 | France | 85/79 |
| 808,989 | 9/1936 | France | 85/26 |
| 12,140 of | 1890 | United Kingdom | 85/26 |

Primary Examiner—Ramon S. Britts
Attorney, Agent, or Firm—John E. Reilly

[57] ABSTRACT

An anchor bolt with a pair of expansible limbs on its leading end in spaced-apart relation separated by a diametric slot therebetween is adapted for being driven into engagement with the walls of a blind hole and includes a wedge member in the slot between said limbs for forcibly expanding the limbs into engagement with the walls of said hole and an indicator means for visually determining whether the limbs have been properly expanded in the hole. In the preferred embodiment, the visual means is comprised of an elongated finger extending rearwardly from the wedge member through an axial bore into the head of the bolt on its trailing end, and in an alternate embodiment, a pair of spaced-apart fingers extend rearwardly in respective grooves alongside the shank of the bolt to the inside edge of the head.

5 Claims, 26 Drawing Figures

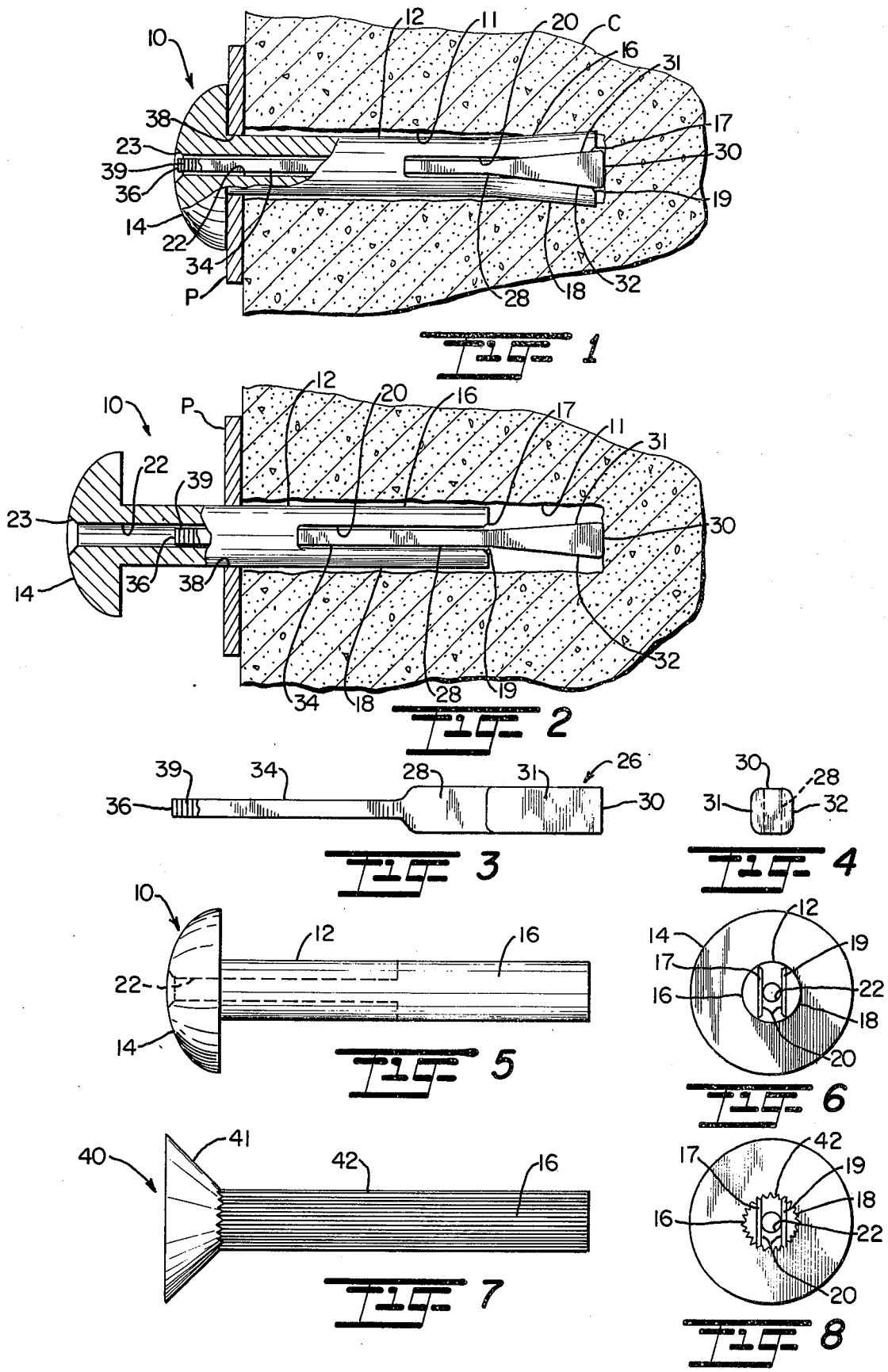

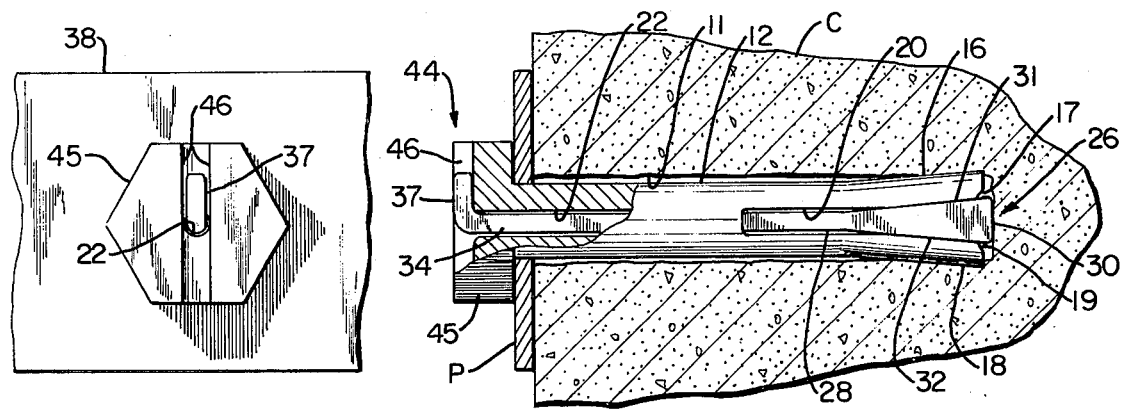
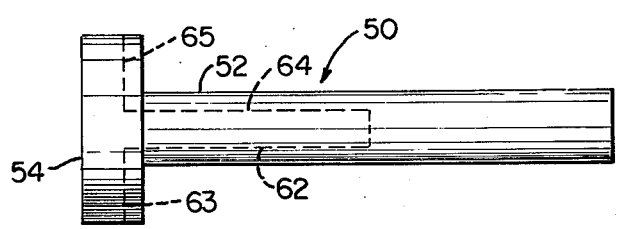
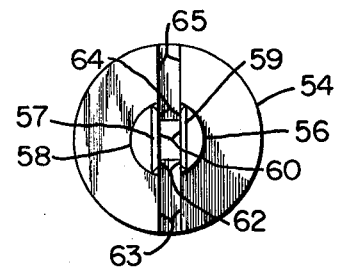
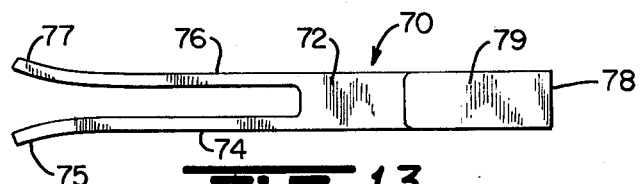
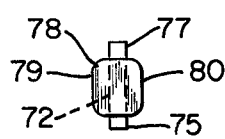
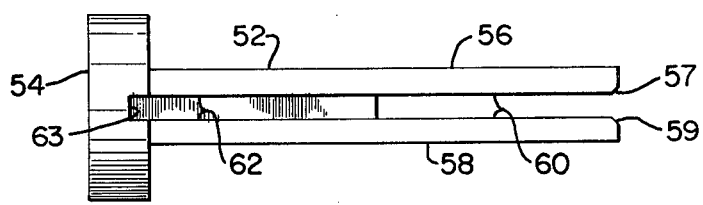
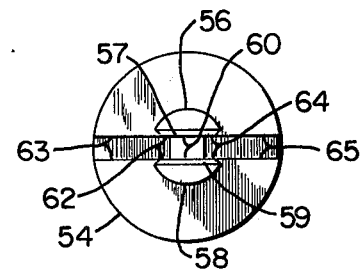

ANCHOR BOLT WITH VISUAL ENGAGEMENT INDICATOR

BACKGROUND OF THE INVENTION

This invention relates generally to fasteners, and more particularly relates to a novel and improved anchor bolt which is so constructed and arranged as to be capable of being driven into anchored engagement with the surrounding wall of a bolt hole, including a visual indicator to show that the expandible members of the bolt have been properly expanded for engagement.

A myriad of anchor bolts have been designed for fastening objects to relatively thick, tough construction materials such as concrete or rock which are positioned so that it is impossible or impractical to thread a nut onto the leading end of a bolt on the opposite side of the construction material from that on which the object is to be fastened. The usual method of anchoring a bolt in a hole, such as in concrete, is to devise some means for inducing frictional engagement between the anchor bolt and the wall of the hole. Most integral anchor bolts have been devised as an alternative to the common combination of an expandable sleeve inserted initially into a hole of somewhat larger diameter than the bolt hole in the object to be anchored and a lag screw with an outside diameter slightly larger than the inside diameter of the sleeve such that when the lag screw is screwed into the sleeve, the sleeve is forced to expand into frictional engagement with the walls of the hole.

Another general category of prior art anchor bolts includes anchor bolts with expandable sleeves that are positively expanded into engagement with the walls of the hole by longitudinal squeezing or wedging forces applied on the sleeves by tightening the nuts on the anchor bolts, such as the device disclosed in my U.S. Pat. No. 3,339,449. While the combination bolt and sleeve devices are effective for their intended purposes, it is not always possible or desirable to provide a hole in the anchoring material which is larger in diameter than the object to be anchored. To alleviate this problem, another category of anchor bolts has been devised which includes wedge members located in circumferential grooves or recesses on the bolt shanks which can be expanded into engagement with the walls of a hole. Usually these anchor bolts depend upon some initial engagement of the wedge device with the wall of the hole whereby further outwardly directed drag on the shank caused by tightening down on the bolt in combination with resistance to the drag due to the initial engagement results in further expansion of the wedge members into tighter engagement with the walls of the hole. Typical of this category of anchor bolts are U.S. Pat. Nos. 3,215,027 issued to H. J. Modrey et al., 3,427,919 issued to L. Lerich, 3,456,551 issued to M. Ishihara, 3,546,998 issued to L. Lerich, 3,703,119 issued to L. Lerich, and 3,744,367 issued to L. Lerich. Continuing problems with obtaining initial engagement of the wedge member with the walls of the hole and the uncertainty associated therewith has led to the development of another variation of the anchor bolt including wedge members in circumferential recessed grooves which are positively actuated or expanded by tightening of a nut on the anchor bolt without depending on initial engagement with the walls of the hole. Examples of this latter group of devices include U.S. Pat. Nos. 2,896,494 issued to L. Lerich, 3,107,569 issued to L. Lerich, and 3,352,193 L. Lerich.

Even though the latter type of device with the positive nut actuated expansion wedges is somewhat more certain of engagement with the walls of the hole, none of the prior art devices provide any method of visually determining whether the wedge members have actually been expanded to their proper position into engagement with the walls of the hole. Further, many times it is somewhat tedious and sometimes virtually impractical to turn the nut or the anchor bolt itself in order to draw the wedge members into engagement with the walls of the hole.

SUMMARY OF THE INVENTION

Accordingly, it is an object of the present invention to provide an anchor bolt which can be driven simultaneously into insertion and engagement with a hole in a rigid material such as concrete or rock.

It is also an object of the present invention to provide a wedge member extending from the leading end of an anchor bolt into abutment with the blind end of a hole in a rigid substance whereby driving insertion of the leading end of the anchor bolt over the wedge member results in positive radial expansion of the anchor bolt into engagement with the walls of the hole.

It is a further object of the present invention to provide a visual indicator for showing that the leading ends of the anchor bolt have positively been radially expanded.

A still further object of the present invention is to provide an anchor bolt which can be driven into positive engagement with the walls of a blind hole by forcing the leading edge of the bolt over oppositely diverging inclined planes of a wedge member abutting against the blind end of the hole and which can be locked to prevent the anchor bolt from becoming disengaged and removed from the hole by prohibiting the bolt from moving in the reversed direction off the inclined surfaces of the wedge member.

An anchor bolt according to the present invention is formed with an elongated shaft, the leading end of which is separated into spaced-apart radially expandible limbs and the trailing edge of which terminates in an enlarged head of common configuration. A wedge member with oppositely diverging inclined surfaces is positioned with its smaller end between the expandible limbs of the bolt shank and its larger end extending forwardly of the expandable limbs, whereby insertion of the bolt shank and wedge member into a blind hole of predetermined length approximately corresponding to the length of the bolt shank results in initial abutment of the large end of the wedge member against the blind end of the hole. Forced insertion of the bolt shank further into the hole such as by driving with a hammer results in the leading ends of the expandable limbs sliding over oppositely inclined surfaces of the wedge member causing radial expansion of the limbs into frictional engagement with the walls of the hole.

In the preferred embodiment of the invention, a narrow finger extends rearwardly from the wedge member through an axial bore in the shank of the bolt. The axial bore extends longitudinally throughout the length of the bolt shank, including the head, whereby the finger will become visible in the bore near the opening in the head when the bolt is driven approximately the entire distance into the hole with the limbs forced over the inclined surfaces of the wedge member. However, if for some reason the leading end of the bolt is not forced nearly the entire distance over the inclined surfaces of the wedge member, such as due to a blind hole which is too deep for the length of the bolt or a hole having a soft blind end which does not resist further movement of the wedge member, the finger will not appear in the axial bore near the opening in the head, thus indicating that the limbs at the leading end of the bolt have not been properly expanded over the inclined surfaces of the wedge member and the anchor bolt is probably not certainly engaged with the walls of the hole.

In an alternate embodiment, the pair of spaced-apart fingers extend rearwardly from the wedge member in longitudinal grooves on opposite sides of the bolt shank. These grooves enter the inside surface of the head, then each respectively extend outwardly in radially opposite directions from each other to the periphery of the head. Consequently, when the wedge member is abutted against a solid blind end of a hole and the limbs on the leading end of the bolt shank are driven over the respective inclined surfaces of the wedge member, the rearwardly extending fingers will remain visible in the radially outwardly directed channels in the inside surface of the bolt head as the bolt is driven the entire length of its shank into the hole. Similarly, if the limbs are not driven over the inclined surfaces of the wedge member, the fingers will not be visible in the radial grooves in the head indicating that the limbs have probably not been properly expanded into engagement with the walls of the hole.

An optional locking feature is available on the preferred embodiment described above by simply providing a rearwardly extending finger of slightly excess length. Consequently, when the bolt shank is driven into the hole and the limbs are forced the entire distance over the respective inclined surfaces of the wedge member, the rearwardly extending finger will protrude through the axial bore and out the head on the rearward end of the bolt. The excess length of the finger can then be bent normal to the bore to retain the finger and the wedge member in its proper position in the bolt shank thereby precluding the possibility of the limbs collapsing radially out of engagement with the wall of the hole.

BRIEF DESCRIPTION OF THE DRAWINGS

Other objects, advantages and capabilities of the present invention will become more apparent as the description proceeds, taken in conjunction with the accompanying drawings, in which:

FIG. 1 is a side elevation view of the anchor bolt, partially cut away, in engagement with the walls of a blind hole in a section of concrete;

FIG. 2 is a side elevation view of the anchor bolt, partially cut away, inserted into the blind hole but just prior to being driven onto the oppositely diverging inclined surfaces of the wedge into engagement with the walls of the hole;

FIG. 3 is a plan view of the wedge member in the preferred embodiment;

FIG. 4 is an end view taken from the enlarged wedge end of the wedge member shown in FIG. 3;

FIG. 5 is a plan view of the anchor bolt into which the wedge member shown in FIGS. 3 and 4 in inserted;

FIG. 6 is an end view taken from the leading end of the anchor bolt shown in FIG. 5;

FIG. 7 illustrates a variation of the anchor bolt shown in FIGS. 5 and 6, including a serrated shank and a countersunk head;

FIG. 8 is an end view taken from the leading end of the anchor bolt shown in FIG. 7;

FIG. 9 is a side elevation of still another variation of the preferred embodiment, partially cut away, showing the indicator means with its excess length bent over to lock the anchor bolt into engagement with the walls of the blind hole in the concrete section;

FIG. 10 is an end view of the trailing end or head of the anchor bolt shown in FIG. 9;

FIG. 11 is a plan view of an alternate embodiment of an anchor bolt which is used in combination with a wedge member having two spaced-apart indicator means extending rearwardly from the wedge member;

FIG. 12 is an end view of the leading end of the anchor bolt shown in FIG. 11;

FIG. 13 is a plan view of the wedge member with two spaced-apart indicator fingers projecting rearwardly of the wedge member for use in combination with the anchor bolt shown in FIGS. 11 and 12;

FIG. 14 is an end view of the enlarged wedge end of the wedge member in FIG. 13;

FIG. 15 is a side elevation of the anchor bolt shown in FIGS. 11 and 12;

FIG. 16 is an end view of the leading end of the anchor bolt embodiment shown in FIG. 15;

DETAILED DESCRIPTION OF THE PREFERRED EMBODIMENT

Figure 17:
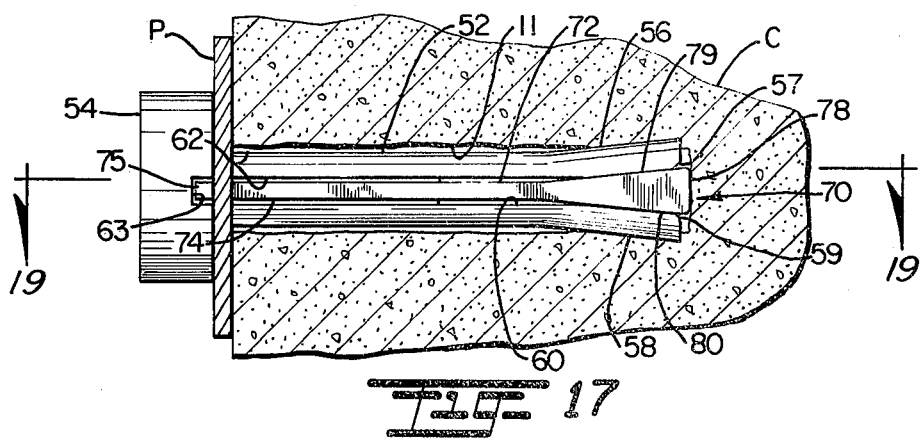
FIG. 17 is a side elevational view of the anchor bolt and wedge member of the alternate embodiment shown in fully inserted engagement with a blind hole in a section of concrete.

The anchor bolt 10 assembled with wedge member 26 of the present invention is seen in FIG. 1 fully inserted and engaged in a blind hole 11 in a section of concrete C for fastening an object or plate P to the surface of the concrete. The anchor bolt 10 and wedge member 26 are also seen in FIG. 2 inserted into the blind hole 11 but prior to being driven into engagement with the hole. The wedge member 26 is also seen in FIGS. 3 and 4 separated from the anchor bolt 10 which is illustrated in FIGS. 5 and 6.

The anchor bolt 10 is essentially comprised of an elongated shank 12 which terminates at its leading end with a pair of expandible limbs 16, 18 in spaced-apart relation to each other leaving a diametric slot 20 therebetween. The shank 12 terminates on its rearward or trailing end with an enlarged head 14. The anchor bolt 10 is initially assembled with the wedge member 26 placed in the slot 20 between the expandable limbs 16, 18. As shown in FIG. 2, the shank 12 with the wedge member 26 can be inserted through a hole 38 in plate P and into a similarly sized blind hole 11 in concrete C until the wedge member 26 abuts against the end of the blind hole. At that point, the anchor bolt 10 must be driven or forced the remaining distance into the hole 11 such as by striking the head 14 with a hammer (not shown). Since the wedge member 26 is restrained against further forward movement by the blind end of the hole, further forward movement of the shank 12 into the hole 11 forces the forward ends of the limbs 16, 18 over the oppositely diverging inclined surfaces 31, 32 of the wedge member causing the limbs 16, 18 to be radially expanded into frictional engagement with the walls of the hole 11 as shown in FIG. 1.

The anchor bolt 10 also includes an axial bore 22 extending from the slot 20 rearwardly through the shank 12 and head 14, terminating in an opening on the rearward end of the head 14. The wedge member 26 is comprised of a flat plate portion 28 which is slightly thinner than the spaced-apart distance between the expandable limbs 16, 18 so that it fits in the slot 20 of the anchor bolt 10. An enlarged or wedge portion 30 extends forwardly of the flat plate portion 28 with inclined surfaces 31, 32 respectively diverging in opposite directions from the central axis. An elongated indicator finger 34 extends rearwardly from the flat plate portion 28 terminating with an indicator end 36.

Prior to inserting the anchor bolt 10 into the hole 11, the wedge member 26 is inserted into the forward or leading end of the anchor bolt 10 with the flat plate portion 28 in the slot 20, the indicator finger 34 extending into the axial bore 22, and the enlarged wedge portion 30 extending forwardly of the limbs 16, 18. With the anchor bolt 10 and the wedge member 26 so assembled, they are inserted through the hole 38 in plate P and into the blind hole 11 in concrete C as shown in FIG. 2. When the assembly is inserted until the enlarged wedge portion 30 abuts the blind end of the hole 11, the indicator end 36 of indicator finger 34 is positioned in the axial bore 22 approximately midway between the slot 20 and the opening in the head 14. When the wedge portion 26 is properly restrained by the end of the blind hole 11, and the anchor bolt 10 is driven its entire length into the hole 11 with its limbs 16, 18 radially expanded into engagement with the walls of the hole 11 by the wedge portion 30, the indicator finger 34 extends nearly the entire distance through the bore 22 with its indicator end 36 positioned near the opening in the head 14 where it can be easily seen.

Because of the physical configuration and coordinated sizes of the anchor bolt 10 and the wedge member 26, one can be assured that the limbs 16, 18 are radially expanded when the indicator end 36 of Finger 34 can be seen near the opening in the head 14. However, if for some reason the limbs 16, 18 have not been driven virtually the entire distance over the inclined surfaces 31, 32 of wedge portion 30, for example due to a hole 11 which is too deep for the length of the anchor bolt 10 or due to the blind end of the hole 11 being soft and unable to properly restrain the wedge member 26, the indicator end 36 of finger 34 would not appear near the opening of bore 22 in head 14 when the shank 12 is fully inserted into the hole 11. Consequently, in the event the shank 12 is driven the entire distance into the hole 11, but the indicator end 36 does not appear near the opening in head 14, the indication would be that the limbs 16, 18 have not been properly expanded and correctional measures would have to be taken, such as removing the anchor bolt 10 and inserting additional packing material into the blind hole to take up the excessive length of the hole and then reinserting the anchor bolt into the hole.

Several optional features of the invention can improve the performance of the anchor bolt, such as the beveled ends, 17, 19 on the inside forward edges of limbs 16, 18, respectively, to minimize resistance to relative movement between the limbs 16, 18 and the inclined surfaces 31, 32 of the enlarged wedge portion 30. The opening of the bore 22 in head 14 can be chamfered as indicated at 23 to prevent burring the opening as the head 14 is struck with a hammer while driving the anchor bolt 10 into the hole 11 and to enhance visual perception of the indicator end 36 as it approaches the opening. The indicator end 36 of finger 34 can also be brightly colored such as with the red paint indicated at 39, to further enhance visual perception of the indicator end 36 as it approaches the opening in head 14.

Although the preferred embodiment of the anchor bolt 10 shown in FIGS. 1 through 6 include a head 14 of the common rounded type widely used on rivets, FIGS. 7 and 8 show a variation of the anchor bolt indicated at 40 including a common countersunk-type head 41. This variation is also shown with a longitudinally serrated shank 42 to further enhance the frictional engagement of the anchor bolt 40 with the walls of the hole 11.

Still another variation of the anchor bolt 10 of FIGS. 1 through 6 is shown in FIGS. 9 and 10, indicated at 44. This variation includes an additional locking feature to retain the wedge member 26 in its fully inserted position relative to the shank 12 with the enlarged wedge portion 30 in slot 20 forcing limbs 16, 18 into radially expanded engagement with the walls of hole 11 as described above. This locking feature is characterized by an indicator finger 34 of excessive length 37 which protrudes outward of the opening of bore 22 in the head when the wedge member 26 is fully inserted into the slot 20. This excessive length 37 can then be bent over the head normal to the longitudinal axis of the shank 12, such as with a hammer. In the embodiment shown in FIGS. 9 and 10, the anchor bolt 44 is provided with a hex head 45 and includes a transverse channel 46 recessed into the rearward surface of the head 45 to accommodate the bent over excessive length 37 of finger 34, leaving an essentially flush rearward surface when the anchor bolt 44 is fully inserted into the blind hole 11 and the wedge member 26 is locked in position. This locking feature is particularly suitable for use in a vibrating environment to prevent the shank 12 from loosening and moving rearwardly with respect to the wedge member 26, thus preventing the limbs 16, 18 from collapsing to result in disengagement of the anchor bolt with the walls of hole 11.

An alternate embodiment of the present invention comprising an anchor bolt 50 and a wedge member 70 with a pair of indicator fingers 74, 76 in spaced-apart relation to each other for positioning in external grooves 62, 64 in anchor bolt 50 is illustrated in FIGS. 11 through 20. This anchor bolt 50 is comprised of a shank 52, radially expandable limbs 56, 58 extending from its leading end in spaced-apart relation to each other forming a slot 60 therebetween, a head 54 on its trailing end (shown here in the form of a filister head), and a pair of longitudinal channels or grooves 62, 64 formed in the external surface of the shank 52 on respectively opposite sides and extending rearwardly from the slot 60. The grooves 62, 64 terminate at their rearward ends in oppositely directed, radially extending grooves 63, 65, respectively in the inside surface of the head 64.

The wedge member 70 includes a flat plate portion 72 in the midsection and an enlarged wedge portion 78 extending forwardly from the flat plate portion 72 with inclined surfaces 79, 80 diverging respectively in opposite directions from the central axis. A pair of indicator fingers 74, 76 extend rearwardly from the flat plate portion 72 in spaced-apart relation to one another and terminate in slightly outwardly curved ends 75, 77 respectively.

Figure 18:
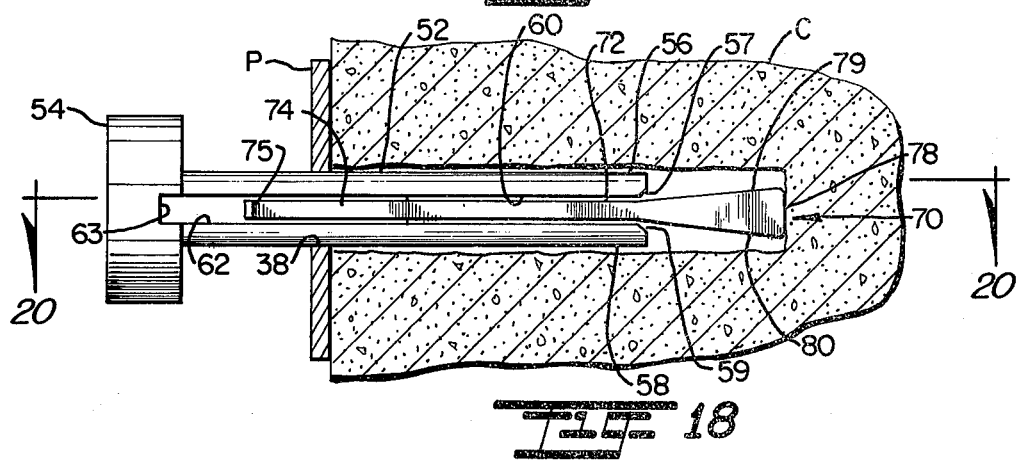
FIG. 18 is a side elevation of the same anchor bolt and wedge member as shown in FIG. 17, prior to being driven into full insertion and engagement in the blind hole.
Figure 19:
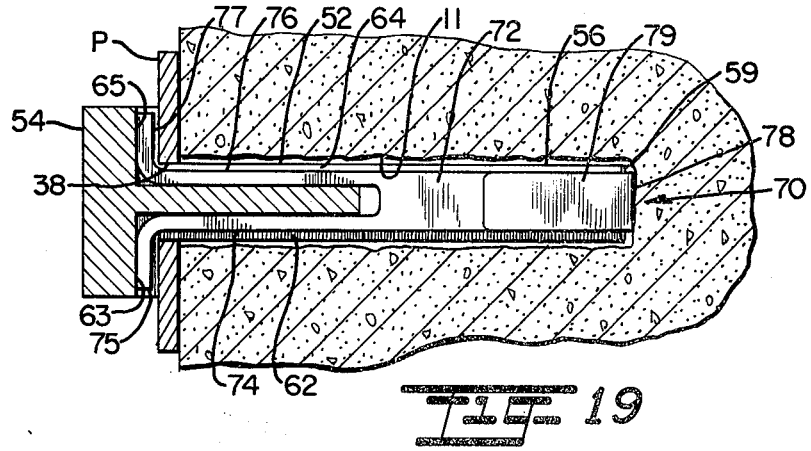
FIG. 19 is a cross-section taken along the plane 19—19 of FIG. 17.
Figure 20:
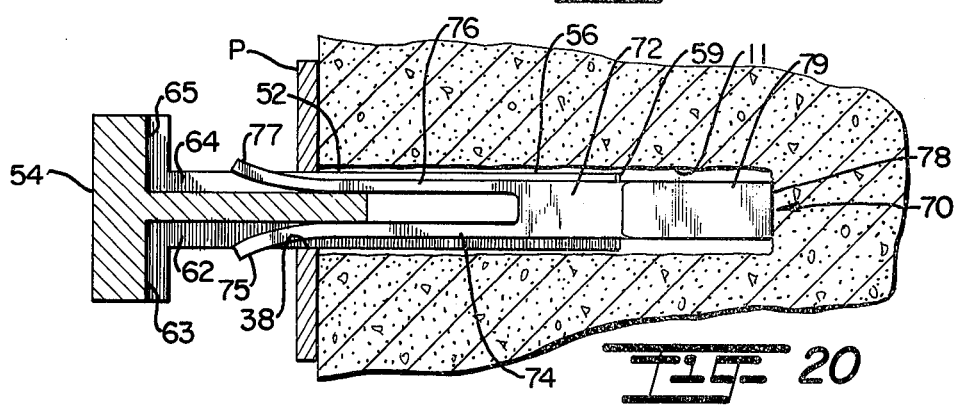
FIG. 20 is a cross-section taken along the plane 20—20 of FIG. 18.

Prior to use, the wedge member 70 is positioned in the anchor bolt 50 as shown in FIGS. 18 and 20 with the flat plate portion 72 in the slot 60 between limbs 56, 58, the enlarged wedge portion 78 extending forwardly of the limbs 56, 58 and the indicator fingers 74, 76 extending rearwardly into grooves 62, 64, respectively, along opposite sides of the shank 62. The plate P is then positioned on the surface of the concrete C with a hole 38 therethrough in alignment with a blind hole 11 in the concrete C. The assembled anchor bolt 50 and wedge member 70 is then inserted through the hole 38 and into the blind hole 11 in the concrete C until the leading end of the enlarged wedge portion 78 of the wedge member 50 abuts against the blind end of hole 11, as shown in FIGS. 18 and 20. The anchor bolt 50 is then driven the remainder of the distance into the blind hole 11 until the inside surface of the head 54 abuts the outside surface of the plate P as shown in FIGS. 17 and 19. The engagement of limbs 56, 58 with the walls of blind hole 11, similar to the description for the preferred embodiment, results from the forward or leading ends of the limbs 56, 58 being forced over the inclined surfaces 79, 80, respectively, causing the limbs 56, 58 to be radially expanded into engagement with the walls of hole 11. The beveled inside edges 57, 59 on the limbs 56, 58 minimize resistance to this relative movement of the components.

As can best be seen in FIGS. 17 through 20, the indicator fingers 74, 76 in this embodiment are visible on the sides of the shank 52 throughout the entire engagement process. As the shank 52 is driven deeper into the hole 11, the wedge member 70 is retained in immovable position by abutment against the blind end of hole 11 resulting in radial expansion of the limbs 56, 58 and relative movement of the indicator fingers 74, 76 in grooves 62, 64, respectively, rearwardly into radially extending channels 63, 65, respectively, in the inside surface of head 54. As can best be seen in FIGS. 17 and 19, in the final stages of advancement of the shank 52 into the hole 11, the rearward ends 75, 77 of finger 74, 76 respectively, are force bent radially outward in grooves 63, 65, respectively, normal to the longitudinal axis of the anchor bolt 50. To assist in this initial bending upon contact with the head 54, the rearward ends 75, 76 are preliminarily bent slightly outward prior to the assembly of the wedge member 70 with the anchor bolt 50, as best seen in FIGS. 13 and 20.

As described above, if the leading end of wedge member 70 is properly retained against movement by the blind end of hole 11 resulting in proper radial expansion of the limbs 56, 58, into engagement with the walls of hole 11, the indicator fingers 74, 76 will remain visible throughout the entire process, ultimately being bent into the position shown in FIGS. 17 and 19. However, if for some reason the wedge member 70 is not properly retained, such as because the hole 11 is too deep for the length of the anchor bolt 50, or because the blind end of the hole 11 is soft or otherwise lacks sufficient strength to properly retain the wedge member 70, the limbs 56, 58 will not be properly expanded by wedge portion 78 into engagement with the walls of the hole 11, and the indicator fingers 74, 76 will disappear from sight into the hole 11. Therefore, disappearance of the indicator fingers 74, 76 into the hole 11 while the anchor bolt 50 is being driven further into the hole is an indication that the limbs 56, 58 are probably not being properly expanded and engagement of the anchor bolt with the walls of hole 11 will not be certain. Again, if this should occur, the anchor bolt 50 and wedge member 70 would have to be removed from the hole 11 and corrective action taken, for example, by placing a fill or packing material into the blind hole 11 to decrease its depth or to provide a solid footing at its blind end to restrain movement of the wedge member 70.

Although not shown in the drawings, the wedge member 70 in this alternate embodiment can also be locked to the anchor bolt 50 when fully inserted into the hole 11 by providing fingers 74, 76 of excessive length which will protrude from the peripheral edges of the head 54 when the limbs 56, 58 are fully expanded. The excessive lengths can then be bent to return over a portion of the exterior surface of the head to restrain the anchor bolt 50 against movement relative to the wedge member 70. A similar locking feature could also be provided by placing the radial grooves 63, 65 internal in the head 54, instead of on the inside surface, so the radial bending of the ends 75, 77 of fingers 74, 76 in the latter stages of insertion of the anchor bolt 50 into hole 11 will be sufficient to restrain against subsequent relative movement between the anchor bolt 50 and the wedge member 70. Even a thin strap at the junction of the longitudinal grooves 62, 64 with the radial grooves 63, 65 would satisfactorily provide a locking feature.

Figure 21:
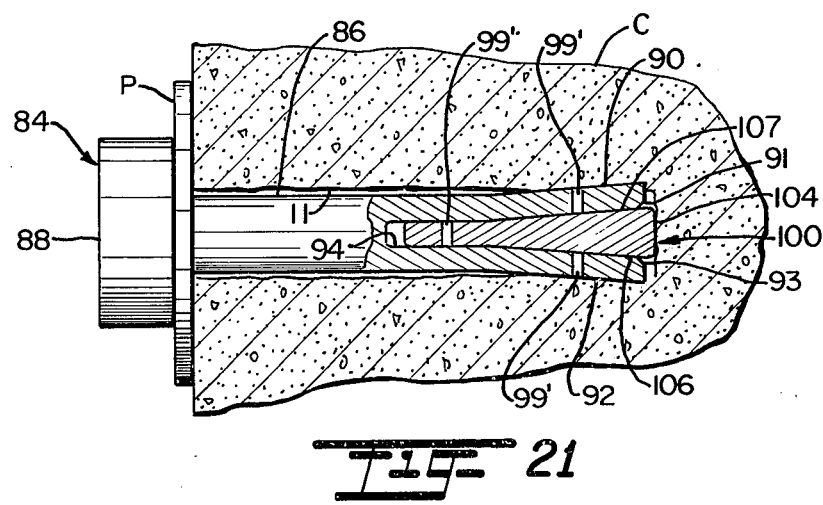
FIG. 21 is a side elevation, partially cut away, of a second alternate embodiment of the anchor bolt and wedge member in fully inserted engagement with a blind hole in a section of concrete.
Figure 22:
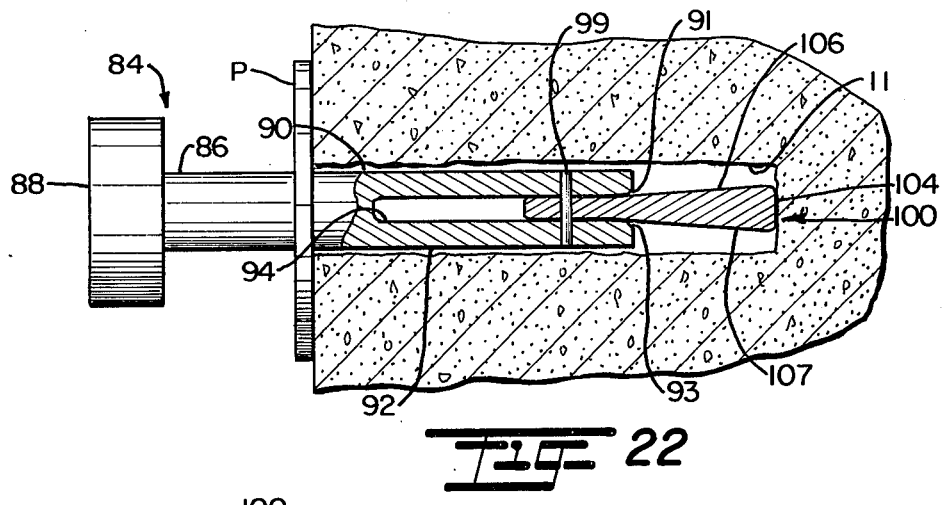
FIG. 22 is a side elevation of the anchor bolt and wedge member of FIG. 21 shown partially inserted into the blind hole just prior to being driven over the wedge member into engagement with the walls of the hole.

Still another embodiment of the present invention is shown in FIGS. 21 through 26, wherein a similar anchor bolt 84 and wedge member 100 are assembled together. In this embodiment, an anchor bolt 84 is comprised of a shank 86 with forwardly extending, radially expandible limbs 90, 92 in spaced-apart relation to each other forming a slot 94 therebetween, and terminating in an enlarged head 88 on its rearward end. The wedge member 100 is comprised of a flat plate portion 102 and a forwardly extending enlarged wedge portion 104 with inclined surfaces 106, 107 diverging in opposite directions away from the central axis. The wedge member 100 and anchor bolt 84 are assembled together as shown in FIG. 2 with the flat plate portion 102 positioned in the slot 94 between limbs 90, 92. Since this embodiment does not include elongated, rearwardly extending indicator fingers which are also useful for retaining the wedge members and anchor bolts in assembled form during insertion into the hole, this embodiment includes a shear pin 99 inserted through commonly aligned holes 96 in the expandible limbs and hole 98 in the flat plate portion 102 to retain the wedge member 100 in assembled position in anchor bolt 84, as shown in FIG. 22. As in the other embodiments, the anchor bolt 84 is inserted through a hole in the plate P and into a blind hole 11 in the concrete C until the leading end of the wedge member 100 abuts against the blind end of the hole 11. The anchor bolt 84 is then driven the remainder of its length into hole 11 until the inside surface of head 88 contacts the outside surface of plate P, during which operation the pin 99 is sheared leaving segments 99' in the respective holes, and the leading ends of limbs 90, 92 are driven forwardly over the respective inclined surfaces 106 and 107 of wedge portion 104 causing the limbs 90, 92 to expand radially into engaging contact with the walls of hole 11, as shown in FIG. 21.

Figure 23:
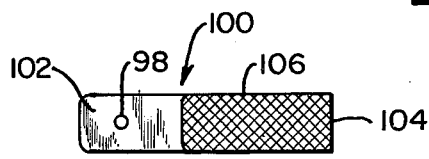
FIG. 23 is a plan view of the wedge member shown in FIGS. 21 and 22, including knurled inclined surfaces.
Figure 24:
FIG. 24 is an end view of the enlarged wedge end of the wedge member shown in FIG. 23.
Figure 25:
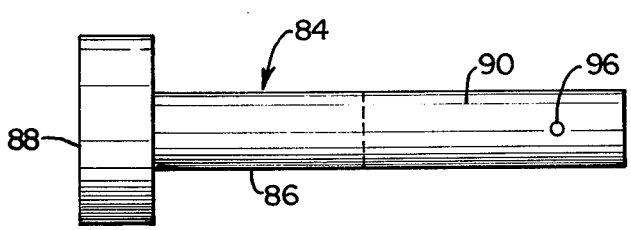
FIG. 25 is a plan view of the anchor bolt shown in FIGS. 21 and 22.
Figure 26:
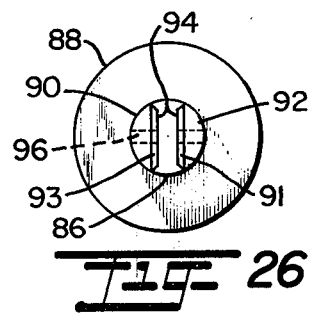
FIG. 26 is an end view of the leading end of the anchor bolt shown in FIG. 25.

Some optional features to enhance the operability of this embodiment includes beveled inside edges 91, 93 to minimize the resistance of forward movement of the limbs 90, 92 over the inclined surfaces 106, 107, and the inclined surfaces 106, 107 are knurled as shown in FIG. 23 to resist reverse relative movement of the limbs 90, 92 with respect to inclined planes 106, 107, thereby inhibiting disengagement of the anchor bolt 84 from the walls of the hole 11.

It can be appreciated that the several optional features described herein, including several head design variations, serrated external surface on the bolt shank, and knurled surfaces on the inclined planes of the wedge members can be interchanged and utilized to equal advantage among the several embodiments described herein.

Although the present invention has been described with a certain degree of particularity, it is understood that the present disclosure has been made by way of example and that changes in details of structure may be made without departing from the spirit and scope thereof.

What is claimed is:

1. An anchor bolt adapted for insertion into anchoring engagement with a blind hole, comprising:
    an elongated unitary shank portion, an enlarged head portion on one end of said shank portion, and a radially expandable portion on the opposite end of said shank portion having limbs extending longitudinally from said opposite end in spaced-apart relation to each other, said shank portion including an axial bore extending entirely through said head and shank portions into communication with the space between said limbs;
    wedge means in the space between said limbs for radially expanding said limbs into frictional and binding engagement with the sides of said blind hole, said wedge means including a flat plate portion thin enough to fit in the space between said limbs and a wedge portion extending longitudinally from said flat plate portion beyond the ends of said limbs and having surfaces diverging away from the longitudinal axis of said bolt in opposite directions such that the largest distance between said surfaces is greater than the space between said limbs, whereby forced movement of said wedge portion between said limbs due to abutment of said wedge portion against the blind end of said hole results in radial expansion of said limbs in relation to the longitudinal axis of said bolt; and
    indicator means in said axial bore for providing a visual indication of radial expansion of said limb in relation to the longitudinal axis of said bolt, said indicator means including an elongated finger extending longitudinally from said flat plate portion of said wedge means and is slidably received into said bore such that rearward axial movement of said wedge portion to a position between said limbs resulting in radial expansion of said limbs also causes said finger to slide rearwardly in said bore whereby expansion of said limbs can be detected by visual perception of the position of said finger within said axial bore, said finger being shorter than the combined length of said shank and head portions of said bolt.

2. The anchor bolt of claim 1, wherein said finger has a bright color on its end to aid in visual perception of its position in said bore.

3. The anchor bolt of claim 2, including a chamfered rim around the opening of said bore in said head portion to preclude burring said rim by blows from a driving object.

4. The anchor bolt of claim 1, wherein the combined length of said finger and said wedge means is longer than the combined length of said shank and head portions such that the distal end of said finger protrudes entirely through said head when said anchor portion is driven fully into the space between said limbs and said distal end of said finger when protruding entirely through said head portion can be bent over to positively engage with the outer surface of said head portion to prevent longitudinal retraction of said wedge means from between said limbs.

5. The anchor bolt of claim 4, including a transverse groove in the outer surface of said head portion extending radially outward from the opening of said bore in said head to receive the bent over distal end of said finger.

* * * * *